(12) United States Patent
Fukuda et al.

(10) Patent No.: US 7,671,160 B2
(45) Date of Patent: Mar. 2, 2010

(54) CURABLE PERFLUOROPOLYETHER COMPOSITIONS AND RUBBER OR GEL ARTICLES COMPRISING THE CURED PRODUCTS OF THE COMPOSITIONS

(75) Inventors: Kenichi Fukuda, Usui-gun (JP); Mikio Shiono, Usui-gun (JP); Hiroyasu Hara, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 661 days.

(21) Appl. No.: 11/350,767

(22) Filed: Feb. 10, 2006

(65) Prior Publication Data

US 2006/0183859 A1 Aug. 17, 2006

(30) Foreign Application Priority Data

Feb. 14, 2005 (JP) ............................. 2005-035823

(51) Int. Cl.
*C08G 77/24* (2006.01)
(52) U.S. Cl. .................... 528/42; 528/36; 528/31; 528/32; 524/588
(58) Field of Classification Search .................. 528/42, 528/36, 31, 32; 524/588
See application file for complete search history.

(56) References Cited

U.S. PATENT DOCUMENTS

| | | | |
|---|---|---|---|
| 5,837,774 A | | 11/1998 | Tarumi et al. |
| 6,080,833 A | * | 6/2000 | Otsuji et al. .................. 528/201 |
| 2001/0047048 A1 | | 11/2001 | Saito |
| 2003/0077478 A1 | * | 4/2003 | Dani et al. .................. 428/673 |
| 2004/0014889 A1 | * | 1/2004 | Fukuda et al. ............... 525/104 |
| 2004/0082710 A1 | * | 4/2004 | Yamaguchi et al. ......... 524/588 |
| 2004/0266925 A1 | | 12/2004 | Shiono |
| 2005/0090602 A1 | | 4/2005 | Koshikawa |
| 2005/0277731 A1 | | 12/2005 | Fukuda et al. |

FOREIGN PATENT DOCUMENTS

| | | |
|---|---|---|
| EP | 0 923 084 A1 | 6/1999 |
| EP | 0 926 182 A2 | 6/1999 |
| EP | 1 295 905 A1 | 3/2003 |
| EP | 1 327 667 A2 | 7/2003 |
| EP | 1 380 610 A1 | 1/2004 |
| EP | 1 380 826 A2 | 1/2004 |
| EP | 1 413 588 A1 | 4/2004 |
| EP | 1 486 534 A1 | 12/2004 |
| JP | 6-51826 | 7/1994 |
| JP | 2501820 B2 | 5/1996 |
| JP | 2519277 B2 | 7/1996 |
| JP | 9-118810 | 5/1997 |
| JP | 2712898 B2 | 2/1998 |
| JP | 10-158360 | 6/1998 |
| JP | 11-240937 | 9/1999 |
| JP | 11-310766 | 11/1999 |
| JP | 2990646 B2 | 12/1999 |
| JP | 2000-159520 | 6/2000 |
| JP | 2000-230110 | 8/2000 |
| JP | 2000-248166 | 9/2000 |
| JP | 3167853 B2 | 5/2001 |
| JP | 2002-80566 | 3/2002 |

* cited by examiner

*Primary Examiner*—Kuo-Liang Peng
(74) *Attorney, Agent, or Firm*—Oblon, Spivak, McClelland, Maier & Neustadt, L.L.P.

(57) ABSTRACT

Curable perfluoropolyether rubber compositions are provided comprising (A) a linear perfluoropolyether compound containing at least two alkenyl groups and having a perfluoropolyether structure containing recurring units —$C_aF_{2a}O$— in its backbone, (B) an organosilicon compound containing at least two SiH groups, (C) an inorganic powder capable of chemical and/or physical adsorption of acidic gases and/or sulfur-containing gases, and (D) a hydrosilylation catalyst. The compositions cure into rubber or gel products having minimal permeability to acidic gases and sulfur-containing gases.

10 Claims, 1 Drawing Sheet

CURABLE PERFLUOROPOLYETHER COMPOSITIONS AND RUBBER OR GEL ARTICLES COMPRISING THE CURED PRODUCTS OF THE COMPOSITIONS

CROSS-REFERENCE TO RELATED APPLICATION

This non-provisional application claims priority under 35 U.S.C. §119(a) on Patent Application No. 2005-035823 filed in Japan on Feb. 14, 2005, the entire contents of which are hereby incorporated by reference.

FIELD OF THE INVENTION

This invention relates to perfluoropolyether rubber or gel compositions which cure into products having heat resistance, oil resistance, chemical resistance, solvent resistance, low-temperature properties, moisture resistance, and low gas permeability and especially, minimal acidic gas permeability. The invention also relates to rubber or gel articles comprising the cured products of the compositions.

BACKGROUND ART

Japanese Patent No. 2,990,646 (JP-A 8-199070) and JP-A 2000-248166 disclose a curable composition comprising a linear perfluoropolyether compound containing at least two alkenyl groups per molecule and having a perfluoropolyether structure in its backbone, an organosilicon compound having at least two H—SiOSiO structures per molecule, and a hydrosilylation catalyst, which cures into a product having a good profile of heat resistance, chemical resistance, solvent resistance, water repellency, oil repellency and weatherability.

These perfluoropolyether rubber compositions perform well in most applications. However, their performance is short in those applications requiring chemical resistance such as sealants in semiconductor manufacturing units, sealants and potting materials for use with engine oil, and sealants and potting materials for use in engine exhaust parts. In such applications, rubber or gel products are urgently desired to prevent or retard electric or electronic parts from corrosion. In some cases, it is necessary to prevent or retard corrosion with acidic gases and sulfur-containing gases. It is thus strongly desired to have perfluoropolyether rubber or gel compositions which cure into products having oil resistance, chemical resistance, and low gas permeability and especially, minimal permeability to acidic gases and sulfur-containing gases.

SUMMARY OF THE INVENTION

An object of the invention is to provide curable perfluoropolyether rubber or gel compositions which when cured, exhibit good heat resistance, solvent resistance, chemical resistance, weatherability, mold release, water repellency and oil repellency and especially minimal permeability to acidic gases and sulfur-containing gases. Another object is to provide rubber or gel articles comprising the same.

The inventors have discovered that when an inorganic powder capable of chemical and/or physical adsorption of acidic gases and/or sulfur-containing gases is incorporated in a perfluoropolyether rubber or gel composition, the resulting composition cures into a non-conductive rubber or gel having a volume resistivity of at least $1 \times 10^9$ Ω-cm and exhibiting minimal permeability to acidic gases and sulfur-containing gases. When electric or electronic parts are covered with the composition, the inorganic powder serves to react with or adsorb acidic gases or sulfur-containing gases for thereby preventing or retarding the electric or electronic parts from corrosion with such gases.

Accordingly, in one aspect, the present invention provides a curable perfluoropolyether rubber composition comprising:

(A) 100 parts by weight of a linear perfluoropolyether compound containing at least two alkenyl groups per molecule and having a perfluoropolyether structure containing recurring units —$C_aF_{2a}O$— wherein a is an integer of 1 to 6 in its backbone, (B) a curing amount of an organosilicon compound containing at least two silicon-bonded hydrogen atoms per molecule, (C) 0.1 to 50 parts by weight of an inorganic powder capable of chemical and/or physical adsorption of acidic gases and/or sulfur-containing gases, and (D) a catalytic amount of a hydrosilylation catalyst, said composition being cured into a rubber.

In another aspect, the present invention provides a perfluoropolyether composition comprising:

(A) 25 to 65 parts by weight of a linear perfluoropolyether compound containing at least two alkenyl groups per molecule and having a perfluoropolyether structure containing recurring units —$C_aF_{2a}O$— wherein a is an integer of 1 to 6 in its backbone, (E) 75 to 35 parts by weight of a polyfluoromonoalkenyl compound containing one alkenyl group per molecule and having a perfluoropolyether structure in its backbone, the total amount of components (A) and (E) being 100 parts by weight, (B) a curing amount of an organosilicon compound containing at least two silicon-bonded hydrogen atoms per molecule, (C) 0.1 to 50 parts by weight of an inorganic powder capable of chemical and/or physical adsorption of acidic gases and/or sulfur-containing gases, and (D) a catalytic amount of a hydrosilylation catalyst, said composition being cured into a gel.

In this case, component (E) is preferably a polyfluoromonoalkenyl compound having the general formula (2):

$$Rf^1-(X')_p-CH=CH_2 \tag{2}$$

wherein X' and p are as defined below, $Rf^1$ is a group of the general formula:

$$F-[CF(CF_3)CF_2O]_w-CF(CF_3)-$$

wherein w is an integer of 1 to 500.

Preferably, component (A) is a linear perfluoropolyether compound having the general formula (1):

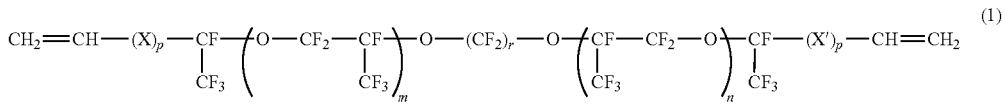

wherein X is —CH$_2$—, —CH$_2$O—, —CH$_2$OCH$_2$— or —Y—NR$^1$—CO— wherein Y is —CH$_2$— or a dimethylphenylsilylene group of the structural formula (Z):

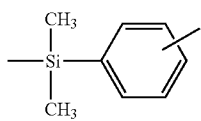

(inclusive of o-, m- and p-positions), and R$^1$ is hydrogen, methyl, phenyl or allyl, X' is —CH$_2$—, —OCH$_2$—, —CH$_2$OCH$_2$— or —CO—NR$^2$—Y— wherein Y is —CH$_2$— or a dimethylphenylsilylene group of the structural formula (Z'):

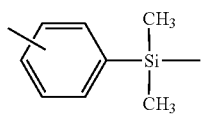

(inclusive of o-, m- and p-positions), and R$^2$ is hydrogen, methyl, phenyl or allyl, p is independently 0 or 1, r is an integer of 2 to 6, m and n each are an integer of 0 to 600, the sum of m+n is 50 to 600.

Component (C) is preferably a metal powder such as copper, a powdered active carbon having porosity, or a powdered compound having hydrotalcite structure.

The composition preferably further comprises (F) at least one linear polyfluoro compound selected from the class consisting of compounds having the general formula (3):

wherein A is a group of C$_e$F$_{2e+1}$— wherein e is 1 to 3, and d is an integer of 1 to 500, and compounds having the general formula (4):

wherein A is as defined above, and f and h each are an integer of 1 to 300.

The cured products of the compositions preferably have a volume resistivity of at least 1×10$^9$ Ω-cm.

The present invention also provides an above composition in the cured state, especially for use in automobiles, chemical plants, ink jet printers, semiconductor manufacturing lines, analytical and scientific instruments, medical equipment, aircraft or fuel cells.

The present invention further provides a pressure sensor for use in automobiles comprising a sensor section for detecting a pressure and generating an electric signal in response to the detected pressure value, and a protective member with chemical resistance covering the sensor section for protection, said protective member comprising the above perfluoropolyether composition.

BENEFITS OF THE INVENTION

The perfluoropolyether compositions of the invention cure into rubber or gel products that exhibit good heat resistance, oil resistance, chemical resistance, solvent resistance, low-temperature properties, moisture resistance and low gas permeability, and especially minimal permeability to acidic gases and sulfur-containing gases.

DESCRIPTION OF THE PREFERRED EMBODIMENTS

Component A

Figure 1:
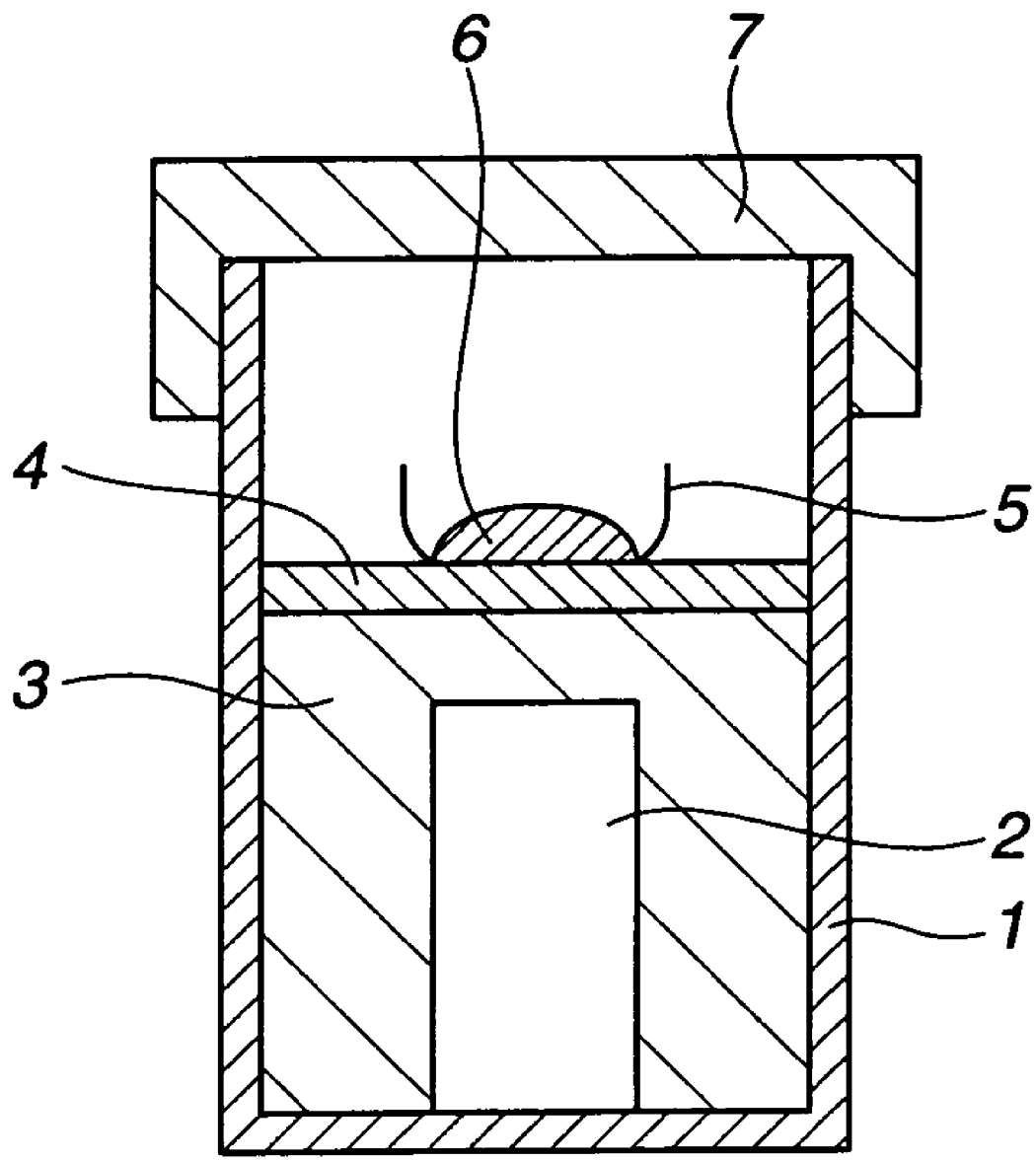
FIG. 1 is a schematic cross-sectional view of a corrosion test setup.

Component (A) of the curable perfluoropolyether compositions according to the invention is a linear perfluoropolyether compound containing at least two alkenyl groups per molecule and having a perfluoropolyether structure, preferably divalent perfluoroalkylether structure, in its backbone.

The perfluoroalkyl ether structures include structures comprising a plurality of recurring units —C$_a$F$_{2a}$O— wherein a is at each occurrence an integer of 1 to 6, for example, structures represented by the general formula (5):

wherein q is an integer of 50 to 600, preferably 50 to 400, more preferably 50 to 200.

Examples of the recurring units —$C_aF_{2a}O$— are:
—$CF_2O$—, —$CF_2CF_2O$—, —$CF_2CF_2CF_2O$—,
—$CF(CF_3)CF_2O$—, —$CF_2CF_2CF_2CF_2O$—,
—$CF_2CF_2CF_2CF_2CF_2CF_2O$—, and —$C(CF_3)_2O$—.

Of these, —$CF_2O$—, —$CF_2CF_2O$—, —$CF_2CF_2CF_2O$—, and —$CF(CF_3)CF_2O$— are preferred. It is understood that the perfluoroalkyl ether structure may consist of recurring units —$C_aF_{2a}O$— of one type or recurring units of two or more types.

The alkenyl groups in the linear perfluoropolyether compound (A) are preferably those groups having 2 to 8 carbon atoms, especially 2 to 6 carbon atoms, and terminated with a $CH_2$=CH— structure, for example, vinyl, allyl, propenyl, isopropenyl, butenyl, and hexenyl. Of these, vinyl and allyl are preferred. The alkenyl groups may be attached to the backbone of perfluoropolyether compound at both ends either directly or through divalent linkages such as —$CH_2$—, —$CH_2O$— or —Y—NR—CO—. Herein Y is —$CH_2$— or a dimethylphenylsilylene group of the formula (Z):

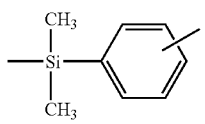
(Z)

(inclusive of o-, m- and p-positions), and R is hydrogen, methyl, phenyl or allyl. There should be included at least two alkenyl groups per molecule.

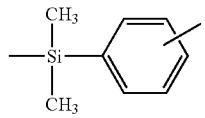
(Z)

(inclusive of o-, m- and p-positions)

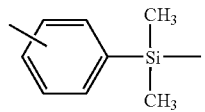
(Z')

(inclusive of o-, m- and p-positions) $Rf^2$ is a divalent perfluoropolyether structure, and preferably one of the formula (5): $(C_aF_{2a}O)_q$. Q is a divalent hydrocarbon group having 1 to 15 carbon atoms which may contain an ether bond, for example, an alkylene group or an alkylene group containing an ether bond. The letter p is independently 0 or 1.

The linear perfluoropolyether compound serving as component (A) is most preferably a compound of the general formula (1).

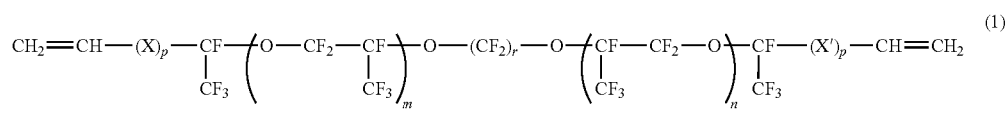
(1)

Suitable perfluoropolyether compounds (A) include polyfluorodialkenyl compounds of the general formulae (6) and (7).

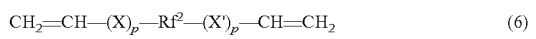
(6)

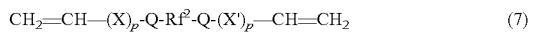
(7)

In formulae (6) and (7), X is independently —$CH_2$—, —$CH_2O$—, —$CH_2OCH_2$— or —Y—$NR^1$—CO— wherein Y is —$CH_2$— or a dimethylphenylsilylene group of the structural formula (Z) and $R^1$ is hydrogen, methyl, phenyl or allyl. X' is —$CH_2$—, —$OCH_2$—, —$CH_2OCH_2$— or —CO—$NR^2$—Y'— wherein Y' is —$CH_2$— or a dimethylphenylsilylene group of the structural formula (Z') and $R^2$ is hydrogen, methyl, phenyl or allyl.

Herein, X, X' and p are as defined above, r is an integer of 2 to 6, each of m and n is an integer of 0 to 600, and the sum of m+n is 50 to 600.

The linear perfluoropolyether compound of formula (1) should desirably have a weight-average molecular weight (Mw) of 10,000 to 100,000, and most preferably 10,000 to 50,000 by gel permeation chromatography (GPC) based on polystyrene standard. Compounds with Mw of less than 10,000 undergo substantial swell in gasoline and other solvents, as demonstrated by a swell factor of at least 6% in gasoline, failing to meet the requirements of parts that must be gasoline resistant. Compounds with Mw of more than 100,000 are too viscous to work, detracting from practical utility.

Illustrative examples of the linear perfluoropolyether compound of formula (1) are given below.

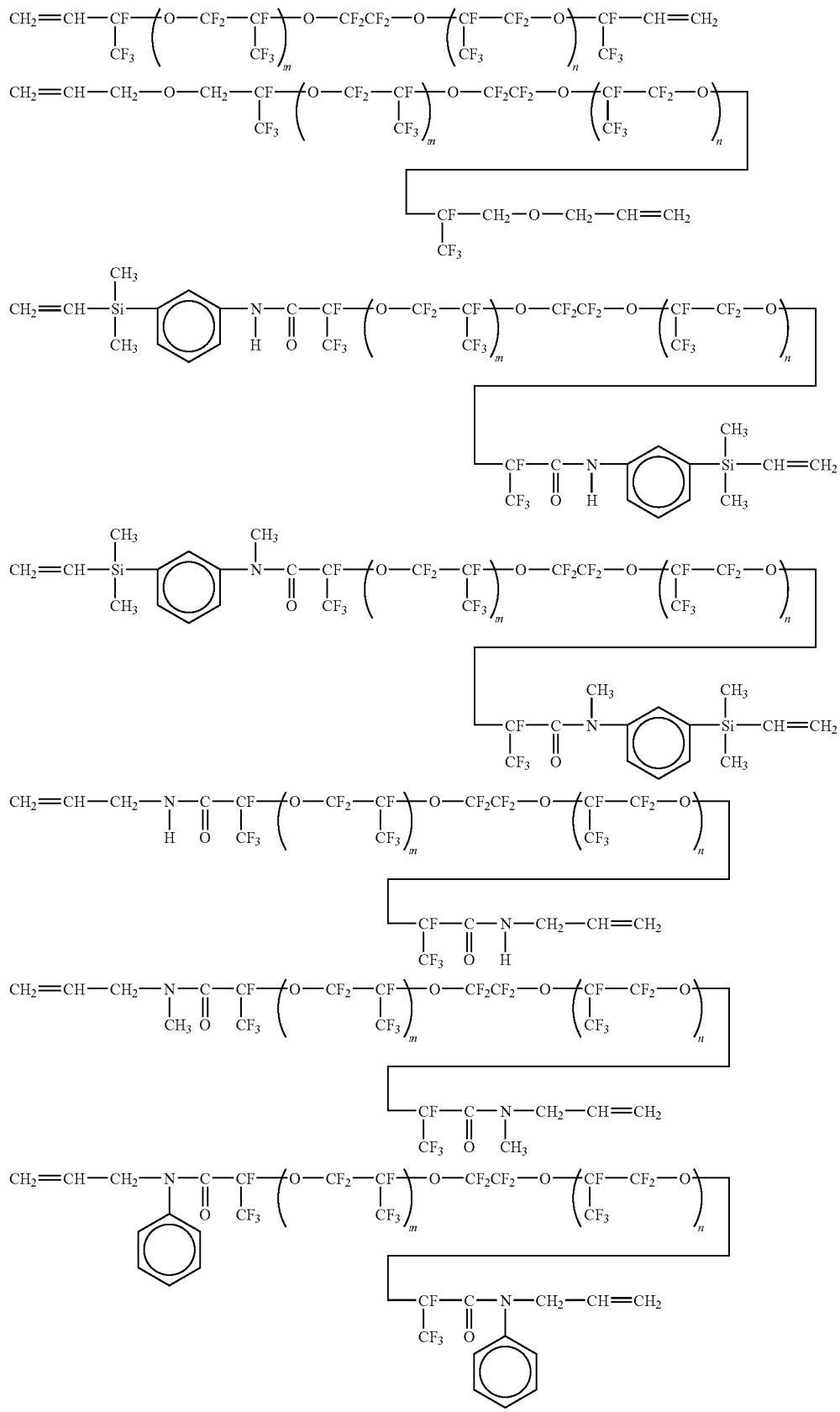

Note that each of m and n is an integer of 0 to 600, preferably 0 to 200, and the sum of m+n is 50 to 600, preferably 50 to 200.

In the practice of the invention, to modify the linear perfluoropolyether compound of formula (1) to the desired weight-average molecular weight in accordance with the intended use, the linear perfluoropolyether compound may be previously subjected to hydrosilylation with an organosilicon compound bearing two SiH groups in a molecule by an ordinary method and under ordinary conditions. The resulting chain-extended product can be used as component (A).

Component B

Component (B) is an organosilicon compound having at least two silicon atom-bonded hydrogen atoms (i.e., SiH groups) in a molecule. The organosilicon compound (B) serves as a crosslinking agent and chain extender for component (A). When compatibility with and dispersion in component (A) and components (E) and (F) to be described later and uniformity after curing are taken into account, the organosilicon compound should preferably have at least one monovalent perfluoroalkyl, monovalent perfluorooxyalkyl, divalent perfluoroalkylene or divalent perfluorooxyalkylene group in a molecule.

Suitable organosilicon compounds include, but are not limited to, well-known organosilicon compounds as described in the above-referred JP-A 8-199070 and JP-A 2000-248166.

Preferred are cyclic organosilicon compounds of the general formula (8).

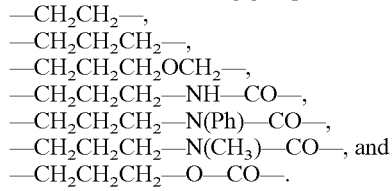

(8)

Herein Rf$^3$ is a monovalent perfluoroalkyl or perfluoropolyether group, R$^3$ is a monovalent hydrocarbon group of 1 to 20 carbon atoms, R$^4$ is a divalent hydrocarbon group of 2 to 20 carbon atoms which may contain an ether bond, amido bond, carbonyl bond or ester bond, k is an integer of at least 2, l is an integer of 1 to 6, and the sum of k+l is 3 to 10.

Examples of monovalent perfluoroalkyl or perfluoropolyether groups represented by Rf$^3$ include monovalent perfluoroalkyl groups: $C_bF_{2b+1}$— wherein b is an integer from 1 to 20, and preferably from 2 to 10 and monovalent perfluorooxyalkyl groups:

wherein n is an integer from 2 to 200, preferably 2 to 100.

R$^3$ is a monovalent hydrocarbon group of 1 to 20 carbon atoms, preferably 1 to 12 carbon atoms, for example, alkyl groups such as methyl, ethyl, propyl, isopropyl, butyl, isobutyl, tert-butyl, pentyl, hexyl, octyl and decyl; cycloalkyl groups such as cyclopentyl, cyclohexyl and cycloheptyl; alkenyl groups such as vinyl, allyl, propenyl, isopropenyl, butenyl and hexenyl; aryl groups such as phenyl, tolyl, xylyl and naphthyl; and aralkyl groups such as benzyl, phenylethyl, phenylpropyl. Of these, those free of aliphatic unsaturation are preferred.

R$^4$ is a divalent hydrocarbon group of 2 to 20 carbon atoms which may contain an ether bond, amido bond, carbonyl bond or ester bond. Such divalent linking groups include alkylene groups, arylene groups, and combinations thereof, in which may intervene an ether-bonding oxygen atom (—O—), an amide bond (—NRCO— wherein R is hydrogen atom, an alkyl group of 1 to 4 carbon atoms or phenyl group), a carbonyl bond (—CO—), an ester bond (—COO—) or the like, with those of 2 to 12 carbon atoms being preferred. Examples of suitable divalent linking groups are:

—CH$_2$CH$_2$—,
—CH$_2$CH$_2$CH$_2$—,
—CH$_2$CH$_2$CH$_2$OCH$_2$—,
—CH$_2$CH$_2$CH$_2$—NH—CO—,
—CH$_2$CH$_2$CH$_2$—N(Ph)—CO—,
—CH$_2$CH$_2$CH$_2$—N(CH$_3$)—CO—, and
—CH$_2$CH$_2$CH$_2$—O—CO—.

Note that Ph is phenyl.

Component (B) is generally included in an amount effective for curing components (A) and (E), specifically an amount of supplying preferably 0.2 to 2 moles, and more preferably 0.5 to 1.5 moles, of hydrosilyl (SiH) groups per mole of total alkenyl groups on components (A) and (E). Too little hydrosilyl (SiH) groups may lead to an inadequate degree of crosslinking or under-cure, whereas too much may cause foaming during curing.

Component C

Component (C) is an inorganic powder capable of chemical and/or physical adsorption of acidic gases and/or sulfur-containing gases. Suitable powders include powdered metals and powdered compounds having hydrotalcite structure, capable of chemical adsorption of acidic gases and/or sulfur-containing gases, and powdered active carbon having porosity capable of physical adsorption of acidic gases and/or sulfur-containing gases.

As used herein, "acidic gases" and "sulfur-containing gases" are generally known as corrosive gases and include gases of NOx, SOx, acetic acid, formic acid, nitric acid, sulfuric acid, sulfur, and sulfurous acid.

The powdered metal as component (C) enables to prevent or retard acidic gases or sulfur-containing gases from reaching electric or electronic parts by chemically converting acidic gases or sulfur-containing gases into oxides or sulfides. Examples of metals having such an effect include silver, copper, iron, nickel, aluminum, tin, and zinc. Of these, powdered copper is preferred for stability and cost. The shape and nature of powdered metal are not particularly limited as long as the desired effect is exerted. In consideration of the impurity content and fluidity of the composition loaded with the powdered metal, atomized metal is preferred. Suitable powdered metals are commercially available, for example, under the trade name of copper powder (flake) 3L3 by Fukuda Metal Foil Industry Co., Ltd., copper powder (atomized powder) FCC-SP-99 by Fukuda Metal Foil Industry Co., Ltd., and iron powder (atomized powder) Atomel 300M by Kobe Steel, Ltd.

The powdered compounds having hydrotalcite structure are compounds of magnesium and aluminum and have an exchangeability with anions of acidic gases or sulfur-containing gases, enabling to prevent or retard acidic gases or sulfur-containing gases from reaching electric or electronic parts.

With respect to the powdered compounds having hydrotalcite structure, the known hydrotalcites can be used. Numerous proposals for improving water-vapor resistance reliability and heat resistance property as ion-trapping agents of semiconductor trapping agents are shown in Japanese Patent Nos. 2501820, 2519277, 2712898 and 3167853, JP-B 06-051826, JP-A 09-118810, JP-A 10-158360, JP-A 11-240937, JP-A 11-310766, JP-A 2000-159520, JP-A 2000-230110, and JP-A 2002-080566. Any hydrotalcite described in the above patent documents can be used.

Especially, the compound represented by the general formula (9) can be used as the powdered compound having hydrotalcite structure:

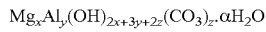

wherein x, y and z have the relationship of $0 < y/x \leq 1$ and $0 \leq z/y < 1.5$, and $\alpha$ is an integer.

Examples of the powdered compounds having hydrotalcite structure include $1.25Mg(OH)_2 \cdot Al(OH)_3 \cdot zCO_3 \cdot \alpha H_2O$,
$Mg_6Al_2(OH)_{16}CO_3 \cdot 4H_2O$, and
$Mg_{4.5}Al_2(OH)_{13}CO_3 \cdot 3.5H_2O$.

Hydrotalcite has an anion exchangeability. In contact with HCl gas, for example, chemical adsorption occurs according to the reaction scheme below.

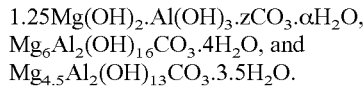

The powdered compounds having hydrotalcite structure are commercially available, for example, under the trade name of Kyoward 500, Kyoward 1000 and DHT-4A-2 by Kyowa Chemical Industry Co., Ltd.

A further embodiment of the inorganic powder capable of physical adsorption of acidic gases and/or sulfur-containing gases is powdered active carbon having porosity. It is capable of selective adsorption of acidic gases or sulfur-containing gases within the porous structure, enabling to prevent or retard acidic gases or sulfur-containing gases from reaching electric or electronic parts. Examples of the powdered active carbon include steam-activated carbon produced from wooden raw materials by steam activation and zinc chloride-activated carbon produced by chemical activation and purification. The powdered active carbon with porosity is commercially available, for example, under the trade name of activated carbon Shirasagi grades A, C, M and P by Nippon Enviro-Chemicals, Ltd.

The amount of the inorganic powder (C) added should be enough to achieve the desired effect of preventing or retarding acidic gases or sulfur-containing gases from reaching electric or electronic parts and is typically 0.1 to 50 parts by weight per 100 parts by weight of component (A) or components (A) and (E) combined. For the fluidity of the composition and the volume resistivity of the cured composition, the preferred amount of the inorganic powder is 0.3 to 30 parts by weight, even more preferably 0.5 to 20 parts by weight.

If the cured perfluoropolyether composition is electroconductive or has a volume resistivity of less than $1 \times 10^9$ $\Omega$-cm, the composition is unacceptable in coating electric or electronic parts therewith. It is necessary to maintain a certain volume resistivity. Thus the type and amount of the inorganic powder should be selected so that the cured perfluoropolyether composition has a volume resistivity of equal to or more than $1 \times 10^9$ $\Omega$-cm, especially equal to or more than $1 \times 10^{10}$ $\Omega$-cm.

Component D

Component (D) is a hydrosilylation catalyst which promotes addition reaction between alkenyl groups in components (A) and (E) and hydrosilyl groups in component (B). The hydrosilylation catalysts are typically noble metal compounds which are expensive. Platinum and platinum compounds are thus used because they are readily available.

Exemplary platinum compounds include chloroplatinic acid, complexes of chloroplatinic acid with olefins such as ethylene, complexes of chloroplatinic acid with alcohols and vinylsiloxanes, and metallic platinum supported on silica, alumina or carbon, though are not limited thereto. Known platinum group metal compounds other than the platinum compounds include rhodium, ruthenium, iridium, and palladium compounds, for example, $RhCl(PPh_3)_3$, $RhCl(CO)(PPh_3)_2$, $Ru_3(CO)_{12}$, $IrCl(CO)(PPh_3)_2$, and $Pd(PPh_3)_4$ wherein Ph denotes phenyl.

The amount of the hydrosilylation catalyst used may be a catalytic amount, and preferably an amount to give 0.1 to 100 ppm of platinum group metal based on the total weight of components (A), (B) and (E).

Component E

Component (E) is a polyfluoromonoalkenyl compound containing one alkenyl group per molecule and having a perfluoropolyether structure in its backbone. It is preferably a polyfluoromonoalkenyl compound having the general formula (2):

$$Rf^1—(X')_p—CH=CH_2 \quad (2)$$

wherein X' and p are as defined above, $Rf^1$ is a group of the general formula:

$$F—[CF(CF_3)CF_2O]_w—CF(CF_3)—$$

wherein w is an integer of 1 to 500, preferably 2 to 200.

Illustrative examples of the polyfluoromonoalkenyl compound having formula (2) are given below.

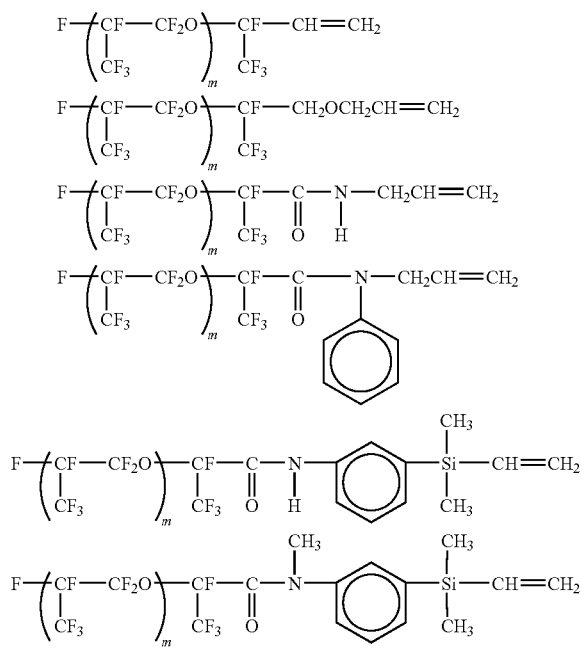

Herein m is an integer of 1 to 200, preferably 2 to 100.

In the curable perfluoropolyether gel composition, an amount of the polyfluoromonoalkenyl compound (E) having formula (2) compounded is selected so that the amount of component (A) or the linear perfluoropolyether compound containing at least two alkenyl groups per molecule is 25 to 65 parts by weight and the amount of component (E) or the polyfluoromonoalkenyl compound containing one alkenyl group per molecule is 75 to 35 parts by weight, and the total amount of components (A) and (E) is 100 parts by weight.

Component F

Regardless of whether it is a rubber or gel composition, the perfluoropolyether composition of the invention may further comprise (F) a nonfunctional fluoropolymer having a perfluoropolyether structure comprising recurring units —$C_aF_{2a}O$— wherein a is as defined above, but free of alkenyl groups. This nonfunctional fluoropolymer is most preferably linear.

The linear perfluoropolyether compound, when compounded as component (F), serves to improve chemical resistance, solvent resistance and low-temperature properties without detracting from physical properties. Particularly when it is compounded in perfluoropolyether rubber and gel compositions, it is effective for imparting improved low-temperature properties, typically lowering the glass transition temperature.

Component (F) is preferably at least one linear perfluoropolyether compound selected from the class consisting of compounds having the general formula (3):

$$A\text{-}O\text{—}(CF_2CF_2CF_2O)_d\text{-}A \quad (3)$$

wherein A is a group of $C_eF_{2e+1}$— wherein e is 1 to 3, and d is an integer of 1 to 500, preferably 2 to 200, and compounds having the general formula (4):

$$A\text{-}O\text{—}(CF_2O)_f(CF_2CF_2O)_h\text{-}A \quad (4)$$

wherein A is as defined above, and f and h each are an integer of 1 to 300, preferably 1 to 100.

Illustrative examples of component (F) are:

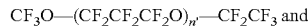

$$CF_3O\text{—}(CF_2CF_2CF_2O)_{n'}\text{—}CF_2CF_3 \text{ and}$$

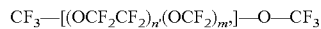

$$CF_3\text{—}[(OCF_2CF_2)_{n'}(OCF_2)_{m'}]\text{—}O\text{—}CF_3$$

wherein m' is an integer of 1 to 200, n' is an integer of 1 to 200, and m'+n' is 1 to 200.

An appropriate amount of component (F) compounded varies whether the perfluoropolyether composition is a rubber or gel composition. In the perfluoropolyether gel composition, the preferred amount of component (F) is 20 to 100 parts by weight per 100 parts by weight of components (A) and (E) combined, i.e., polyfluorodialkenyl compound plus polyfluoromonoalkenyl compound. In the perfluoropolyether rubber composition, the preferred amount of component (F) is 10 to 50 parts by weight per 100 parts by weight of component (A). Component (F) may be one or more of suitable compounds.

Other Components

In addition to components (A) to (F) described above, the compositions of the invention may further comprise various additives. Suitable hydrosilylation catalyst regulators include acetylenic alcohols such as 1-ethynyl-1-hydroxycyclohexane, 3-methyl-1-butyn-3-ol, 3,5-dimethyl-1-hexyn-3-ol, 3-methyl-1-penten-3-ol and phenylbutynol; 3-methyl-3-penten-1-yne and 3,5-dimethyl-3-hexen-1-yne; polymethylvinylsiloxane cyclic compounds; and organophosphorus compounds. The addition of such regulators keeps appropriate cure reactivity and shelf stability.

Suitable inorganic fillers include fumed silica, fused silica, crystalline silica, iron oxide, zinc oxide, titanium oxide, calcium carbonate, magnesium carbonate, zinc carbonate, and carbon black. The addition of such inorganic fillers adjusts the hardness or mechanical strength of cured products of the compositions. Hollow inorganic fillers or spherical rubbery fillers are also useful.

To impart adhesion, any of well-known tackifiers having epoxy, alkoxy or similar groups may be added. These additives may be used in any desired amounts as long as they do not interfere with properties of the compositions or properties of the cured products.

Cured Products

The perfluoropolyether rubber or gel compositions of the invention cure into satisfactory products having good heat resistance, chemical resistance, solvent resistance, water repellency, oil repellency and weatherability and especially low gas permeability, typically minimal permeability to acidic gases or sulfur-containing gases and thus finding a variety of applications.

The cured perfluoropolyether rubber can be formed by combining 100 parts by weight of component (A) with an amount of component (B) to provide 0.2 to 2.0 moles of hydrosilyl groups per mole of total alkenyl groups in component (A), 0.1 to 50 parts by weight of component (C), and an amount of component (D) to provide 0.1 to 100 ppm of platinum relative to the total weight of components (A) and (B). To the mix, 10 to 50 parts by weight of component (F) may be added if desired for reducing the glass transition temperature.

The cured rubber is formed by any of prior art well-known techniques, for example, by casting the composition into a suitable mold and causing the composition to cure therein, by coating the composition onto a suitable substrate and curing it thereto, or by lamination. The curing is readily achieved by heating at a temperature of about 60 to about 150° C. for about 30 to about 180 minutes.

The rubber thus cured is typically a rubber material having a hardness of 10 to 80 according to JIS K6249 and a glass transition temperature of up to −50° C.

The cured perfluoropolyether gel can be formed by combining 25 to 65 parts by weight of component (A) with 75 to 35 parts by weight of component (E) 100 parts by weight of the total amounts of components (A) and (E), an amount of component (B) to provide 0.2 to 2.0 moles of hydrosilyl groups per mole of total alkenyl groups in components (A) and (E), 0.1 to 50 parts by weight of component (C), and an amount of component (D) to provide 0.1 to 100 ppm of platinum relative to the total weight of components (A), (B) and (E). To the mix, 20 to 100 parts by weight of component (F) may be added if desired for reducing the glass transition temperature.

The cured gel is formed by any of prior art well-known techniques, for example, by casting the composition into a suitable mold and causing the composition to cure therein, by coating the composition onto a suitable substrate and curing it thereto, or by lamination. The curing is readily achieved by heating at a temperature of about 60 to about 150° C. for about 30 to about 180 minutes.

The gel thus cured is typically a gel material having a penetration of 10 to 150 according to the consistency test (using a ¼ cone) of JIS K2220 or ASTM D-1403 and a glass transition temperature of up to −50° C.

Rubber or gel articles comprising the cured perfluoropolyether rubber or gel compositions of the invention are suitable for use in a variety of applications, for example, automobiles, chemical plants, ink jet printers, semiconductor manufacturing lines, analytical or scientific instruments, medical equipment, aircraft, and fuel cells.

Specifically, rubber or gel articles comprising the cured perfluoropolyether rubber or gel compositions of the invention are suitable for use as rubber parts for automobiles, rubber parts for chemical plants, rubber parts for ink jet printers, rubber parts for semiconductor manufacturing lines, rubber parts for analytical and scientific instruments, rubber parts for medical equipment, rubber parts for aircraft, tent coating materials, sealants, molded parts, extruded parts, coats, copier roll materials, electrical and electronic moisture-proof coatings, sensor potting materials, fuel cell sealing materials, and laminate rubber fabrics.

More specifically, rubber or gel articles comprising the cured compositions of the invention include, but are not limited to, rubber parts for automobiles, for example, diaphragms such as fuel regulator diaphragms, pulsation damper diaphragms, oil pressure switch diaphragms, and EGR diaphragms, valves such as canister valves and power control valves, O-rings such as quick connector O-rings and injector O-rings, and seals such as oil seals and cylinder head gaskets;

rubber parts for chemical plants, for example, pump diaphragms, valves, O-rings, packings, oil seals, and gaskets;

rubber parts for ink jet printers and semiconductor manufacturing lines, for example, diaphragms, valves, O-rings, packings, and gaskets;

rubber parts for analytical and scientific instruments and medical equipment, for example, pump diaphragms, O-rings, packings, valves, and joints;

rubber parts for aircraft, for example, O-rings, face seals, packings, gaskets, diaphragms, and valves in fluid piping for engine oil, jet fuel, hydraulic oil and Skydrol®;

rubber parts for fuel cells, for example, sealants between electrodes, O-rings, face seals, packings, gaskets, diaphragms, and valves in hydrogen, air and coolant water feed pipes;

electric and electronic moisture-proof coating materials and sensor potting materials for use in, for example, gas pressure sensors, hydraulic pressure sensors, temperature sensors, humidity sensors, rotation sensors, gravity sensors, timing sensors, air flow meters, electronic circuits, semiconductor modules, and various control units.

In a pressure sensor in which a sensor section for detecting a pressure and generating an electric signal in response to the detected pressure value is covered with a protective member with chemical resistance for protection, the protective member may be made using the curable perfluoropolyether rubber or gel composition of the invention. While prior art pressure sensors include those sensors which are used in an environment exposed to chemicals such as gasoline, typically vacuum sensors for sensing the pressure in an intake manifold in an automobile and those sensors which are used in an environment exposed to acidic gases such as NOx and SOx, typically automotive exhaust gas pressure sensors and automatic transmission sensors, the coverage with the curable perfluoropolyether rubber or gel composition of the invention improves acid resistance and chemical resistance.

When the inventive compositions are potted or coated onto substrates to form cured products thereon, it is advantageous to use conventional primers in order to improve the bond or adhesion of the inventive compositions to substrates. The use of primers prevents penetration of chemicals and solvents from the substrate interface, and improves the acid resistance, chemical resistance and solvent resistance of entire parts.

As the primer, use may be made of silane primers based on silane coupling agents, organohydrogenpolysiloxane-based primers, synthetic rubber-based primers, acrylic resin-based primers, urethane resin-based primers, and epoxy resin-based primers. The perfluoropolyether rubber composition of the invention having a tackifier added thereto is also useful as the primer.

EXAMPLE

Examples are given below by way of illustration and not by way of limitation. Note that all parts (pbw) and % are by weight.

Examples 1-6 & Comparative Examples 1-5

Using the ingredients identified below, several perfluoropolyether rubber or gel compositions were prepared as formulated in Table 1.

The rubber or gel compositions were cured under conditions of 150° C. and 1 hour, following which the hardness and volume resistivity of the cured products were measured. Corrosion tests were also carried out. The results are also shown in Table 1.

Ingredients (a) Inorganic powder
- (a-1) gold powder (flake), SA05 by Ishifuku Metal Co., Ltd.
- (a-2) copper powder (flake), 3L3 by Fukuda Metal Foil Industry Co., Ltd.
- (a-3) copper powder (atomized powder), FCC-SP-99 by Fukuda Metal Foil Industry Co., Ltd.
- (a-4) iron powder (atomized powder), Atomel 300M by Kobe Steel, Ltd.
- (a-5) active carbon, Shirasagi A by Nippon Enviro-Chemicals, Ltd.
- (a-6) synthetic hydrotalcite, Kyoward 500 by Kyowa Chemical Industry Co., Ltd.
- (a-7) synthetic hydrotalcite, Kyoward 1000 by Kyowa Chemical Industry Co., Ltd.
- (a-8) fumed silica, Aerosil R-972 by Nippon Aerosil Co., Ltd.

(b) Perfluoropolyether oil (b-1)

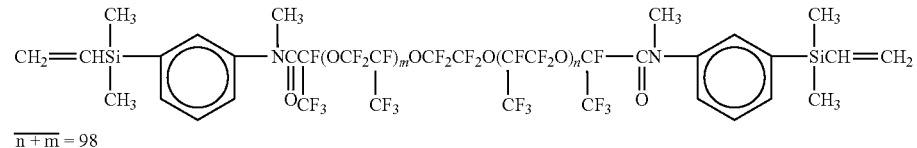

$\overline{n+m} = 98$

-continued (b-2)

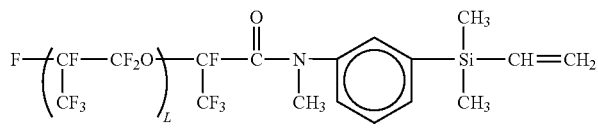

L = 24

(b-3)

$CF_3O$—$(CF_2CF_2CF_2O)_e$—$C_2F_5$

(c) Hydrosiloxane (c-1)

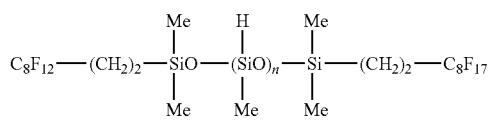

$\overline{n}$ = 15

(c-2)

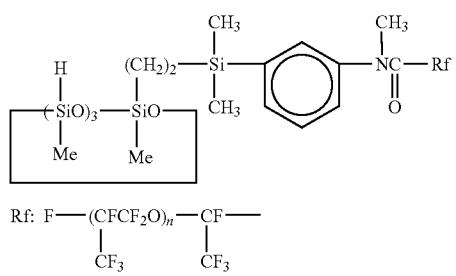

Rf: F—$(CFCF_2O)_n$—CF—
         |           |
         $CF_3$      $CF_3$ n = 24

(d) Catalyst, toluene solution of platinum-divinyltetra-methyldisiloxane complex (platinum content 0.5%)

(e) Curing regulator, 50% toluene solution of ethynyl cyclohexanol (f) Fluorosilicone gel based on trifluoropropyl-bearing silicone, FE57 by Shin-Etsu Chemical Co., Ltd.

(g) Silicone gel based on dimethylsilicone, KE1052 by Shin-Etsu Chemical Co., Ltd.

Corrosion Test A

As shown in FIG. 1, a glass bottle 1 receives a silver-plated copper plate 2. A dimethylsilicone gel 3 is potted and cured to bury the copper plate 2 therein. A perfluoropolyether composition 4 is cured on the gel 3 to a thickness of 3 mm. A polyethylene container 5 having 0.10 g of sulfur powder received therein is rested on the perfluoropolyether composition 4. The bottle 1 is sealed with a metal cap 7. The bottle 1 was held in a thermostat chamber at 80° C. for 28 days, after which the silver plating was visually observed to see how it was corroded. The sample is rated good (○) for no corrosion and unacceptable (X) when it is corroded or blackened.

Corrosion Test B

As shown in FIG. 1, a glass bottle 1 receives a silver-plated copper plate 2. A dimethylsilicone gel 3 is potted and cured to bury the copper plate 2 therein. A perfluoropolyether composition 4 is cured on the gel 3 to a thickness of 3 mm. A polyethylene container 5 having 0.30 g of 36% aqueous hydrochloric acid received therein is rested on the perfluoropolyether composition 4. The bottle 1 is sealed with a metal cap 7. The bottle 1 was held in a thermostat chamber at 80° C. for 28 days, after which the silver plating was visually observed to see how it was corroded. The sample is rated good (○) for no corrosion and unacceptable (X) when it is corroded or blackened.

TABLE 1

| | Ingredients (pbw) | Example | | | | | | Comparative Example | | | | |
|---|---|---|---|---|---|---|---|---|---|---|---|---|
| | | 1 | 2 | 3 | 4 | 5 | 6 | 1 | 2 | 3 | 4 | 5 |
| a-1 | gold powder (flake) | | | | | | | 5 | | | | |
| a-2 | copper powder (flake) | 5 | | | | | | | | | | |
| a-3 | copper powder (atomized) | | | | 5 | | | | | | 5 | 5 |
| a-4 | iron powder (atomized) | | 5 | | | | | | | | | |

TABLE 1-continued

|  | Ingredients (pbw) | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|---|
| a-5 | active carbon |  |  |  |  | 1 |  |  |  |  |  |  |
| a-6 | Kyoward 500 |  |  |  |  |  | 2 |  |  |  |  |  |
| a-7 | Kyoward 1000 |  |  | 3 |  |  |  |  |  |  |  |  |
| a-8 | fumed silica |  |  |  |  |  |  |  |  | 5 |  |  |
| b-1 | Perfluoropolyether 1 | 100 | 100 | 100 | 55 | 55 | 55 | 100 | 100 | 55 |  |  |
| b-2 | Perfluoropolyether 2 |  |  |  | 20 | 20 | 20 |  |  | 20 |  |  |
| b-3 | Perfluoropolyether 3 |  |  |  | 25 | 25 | 25 |  |  | 25 |  |  |
| c-1 | Hydrosiloxane 1 | 2 | 2 | 2 |  |  |  | 2 | 2 |  |  |  |
| c-2 | Hydrosiloxane 2 |  |  |  | 20 | 20 | 20 |  |  | 20 |  |  |
| d | Pt compound | 0.2 | 0.2 | 0.2 | 0.12 | 0.12 | 0.12 | 0.2 | 0.2 | 0.12 |  |  |
| e | curing regulator | 0.3 | 0.3 | 0.3 | 0.15 | 0.15 | 0.15 | 0.3 | 0.3 | 0.15 |  |  |
| f | FE-57 |  |  |  |  |  |  |  |  |  | 100 |  |
| g | KE1052 |  |  |  |  |  |  |  |  |  |  | 100 |
| Hardness JIS K6249 (Durometer A) |  | 38 | 40 | 38 |  |  |  | 37 | 46 |  |  |  |
| Hardness JIS K2220 (Penetration) |  |  |  |  | 78 | 82 | 76 |  |  | 78 | 57 | 62 |
| Corrosion test A | Initial | ○ | ○ | ○ | ○ | ○ | ○ | ○ | ○ | ○ | ○ | ○ |
|  | after 28 days | ○ | ○ | ○ | ○ | ○ | ○ | X | X | X | X | X |
| Corrosion test B | Initial | ○ | ○ | ○ | ○ | ○ | ○ | ○ | ○ | ○ | ○ | ○ |
|  | after 28 days | ○ | ○ | ○ | ○ | ○ | ○ | X | X | X | X | X |
| Volume resistivity (Ω·cm) |  | $2\times10^{14}$ | $1\times10^{14}$ | $1\times10^{14}$ | $5\times10^{14}$ | $2\times10^{10}$ | $4\times10^{14}$ | $1\times10^{14}$ | $6\times10^{14}$ | $2\times10^{14}$ | $3\times10^{12}$ | $2\times10^{15}$ |

Japanese Patent Application No. 2005-035823 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A curable perfluoropolyether composition comprising:
   (A) 25 to 65 parts by weight of a linear perfluoropolyether compound comprising at least two alkenyl groups per molecule and having a perfluoropolyether backbone structure comprising recurring units —$C_aF_{2a}O$—, wherein a is an integer of 1 to 6,
   (E) 75 to 35 parts by weight of a polyfluoromonoalkenyl compound comprising one alkenyl group per molecule and having a perfluoropolyether backbone structure, wherein the total amount of components (A) and (E) is 100 parts by weight,
   (B) a curing amount of an organosilicon compound comprising at least two silicon-bonded hydrogen atoms per molecule,
   (C) 0.1 to 50 parts by weight of a powdered component comprising a powdered hydrotalcite compound, wherein said powdered component (C) is capable of chemical and/or physical adsorption of acidic gas and/or a gas comprising sulfur, and
   (D) a catalytic amount of a hydrosilylation catalyst, wherein the curable perfluoropolyether composition is an non-conductive gel having a volume resistivity of at least $1\times10^9$ Ω·cm upon curing.

2. The composition of claim 1, wherein said linear perfluoropolyether compound (A) has the general formula (1):

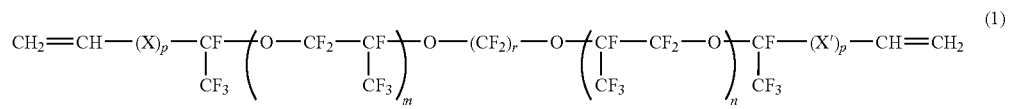

wherein
X is selected from the group consisting of —$CH_2$—, —$CH_2O$—, —$CH_2OCH_2$— and —Y—$NR^1$—CO—, wherein Y is either —$CH_2$— or a dimethylphenylsilylene group of the structural formula (Z):

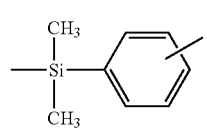

inclusive of o-, m- and p-positions, and $R^1$ is selected from the group consisting of hydrogen, methyl, phenyl or allyl, X' is selected from the group consisting of —$CH_2$—, —$OCH_2$—, —$CH_2OCH_2$— and —CO—$NR^2$—Y—, wherein Y is either —$CH_2$— or a dimethylphenylsilylene group of the structural formula (Z'):

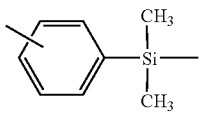

inclusive of o-, m- and p-positions, and $R^2$ is selected from the group consisting of hydrogen, methyl, phenyl or allyl, p is independently 0 or 1, r is an integer of 2 to 6, and m and n each are each independently an integer of 0 to 600, with the proviso that the sum of m+n is 50 to 600.

3. The composition of claim 1, wherein said polyfluoromonoalkenyl compound (A) has the general formula (2):

$$Rf^1—(X')_p—CH=CH_2 \quad (2)$$

wherein

X' is selected from the group consisting of $—CH_2—$, $—OCH_2—$, $—CH_2OCH_2—$ and $—CO—NR^2—Y—$, wherein Y is either $—CH_2—$ or a dimethylphenylsilylene group of the structural formula (Z'):

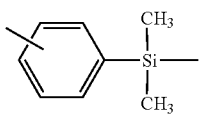

inclusive of o-, m- and p-positions, and $R^2$ is selected from the group consisting of hydrogen, methyl, phenyl and allyl, p is independently 0 or 1, and $Rf^1$ is a group of the general formula;

$$F—[CF(CF_3)CF_2O]_w—CF(CF_3)—$$

wherein w is an integer of 1 to 500.

4. The composition of claim 1, further comprising (F) at least one linear polyfluoro compound selected from the group consisting of compounds having the general formula (3):

$$A-O—(CF_2CF_2CF_2O)_d-A \quad (3)$$

wherein A is a group of $C_eF_{2e+1}—$ wherein e is 1 to 3, and d is an integer of 1 to 500, and compounds having the general formula (4):

$$A-O—(CF_2O)_f(CF_2CF_2O)_h-A \quad (4)$$

wherein A is a group of $C_eF_{2e+1}—$ wherein e is 1 to 3, and f and h are each independently an integer of 1 to 300.

5. A gel article comprising the composition of claim 1 in the cured state.

6. A gel article comprising the composition of claim 1 in the cured state, for use in automobiles, chemical plants, ink jet printers, semiconductor manufacturing lines, analytical and scientific instruments, medical equipment, aircraft or fuel cells.

7. A pressure sensor for use in automobiles comprising a sensor section for detecting a pressure and generating an electric signal in response to the detected pressure value, and a protective member with chemical resistance covering the sensor section for protection, said protective member comprising the perfluoropolyether composition of claim 1.

8. The composition of claim 1, wherein said powdered component (C) is present in an amount of from 0.3 to 30 parts by weight.

9. The composition of claim 1, wherein said powdered component (C) is present in an amount of from 0.5 to 20 parts by weight.

10. The composition of claim 1, which is a non-conductive gel having a volume resistivity of at least $1\times10^{10}$ Ω·cm upon curing.

* * * * *